United States Patent [19]

Tachibana et al.

[11] Patent Number: 5,102,709
[45] Date of Patent: Apr. 7, 1992

[54] OPTICAL RECORDING MEDIUM AND PROCESS FOR PRODUCTION THEREOF

[75] Inventors: Shinichi Tachibana, Machida; Kazuoki Honguu, Yokohama, both of Japan

[73] Assignee: Canon Kabushiki Kaisha, Tokyo, Japan

[21] Appl. No.: 514,289

[22] Filed: Apr. 25, 1990

[30] Foreign Application Priority Data

Apr. 27, 1989 [JP] Japan ................................ 1-105891
May 2, 1989 [JP] Japan ................................ 1-113317

[51] Int. Cl.$^5$ ............................................. B32B 3/02
[52] U.S. Cl. ...................................... 428/64; 428/65; 428/76; 428/423.1; 428/688; 428/913; 369/288; 346/76 L; 346/135.1; 430/945; 427/162; 427/166; 427/167
[58] Field of Search .............. 428/64, 65, 76, 423.1, 428/688, 913; 369/288; 346/76 L, 135.1; 430/945; 427/162, 166, 167

[56] References Cited

U.S. PATENT DOCUMENTS

| | | | |
|---|---|---|---|
| 4,370,391 | 1/1983 | Mori et al. | 428/697 |
| 4,579,777 | 4/1986 | Honguu et al. | 428/336 |
| 4,680,742 | 7/1987 | Yamada et al. | 430/945 |
| 4,740,430 | 4/1988 | Frankenthal et al. | 428/630 |
| 4,801,599 | 1/1989 | Aoyama et al. | 428/336 |
| 4,900,598 | 2/1990 | Suzuki | 428/64 |

FOREIGN PATENT DOCUMENTS

| | | |
|---|---|---|
| 130393 | 10/1981 | Japan . |
| 077647 | 8/1984 | Japan . |
| 146461 | 8/1984 | Japan . |
| 10431 | 1/1985 | Japan . |
| 123593 | 6/1986 | Japan . |
| 052547 | 8/1987 | Japan . |
| 076037 | 9/1987 | Japan . |
| 026852 | 7/1988 | Japan . |
| 206927 | 8/1988 | Japan . |
| 102754 | 8/1989 | Japan . |

OTHER PUBLICATIONS

Applied Phys. Letts., vol. 56, No. 15, 4-9-90, Protective Films . . . , Sugiyama et al, pp. 1403-1405.

*Primary Examiner*—Patrick J. Ryan
*Attorney, Agent, or Firm*—Fitzpatrick, Cella, Harper & Scinto

[57] ABSTRACT

An optical recording medium is formed to include a resinous substrate, a laminate film including an inorganic dielectric layer and a recording layer, and a resinous protective film, respectively disposed on the substrate. The laminate film is formed to have a compression stress of 15-55 kg/mm$^2$ so as to be in a dense film free from cracking or peeling. The resinous protective layer is formed to have a tensile stress of 2.5-5.5 kg/mm$^2$ so as to compensate the compression stress in the laminate film, thus preventing warp and skew of the optical recording medium. The resinous protective film may preferably be formed from a photocurable composition comprising an increased amount of a polyacrylate compound providing a dense film and a urethane acrylate compound providing a flexibility.

22 Claims, 2 Drawing Sheets

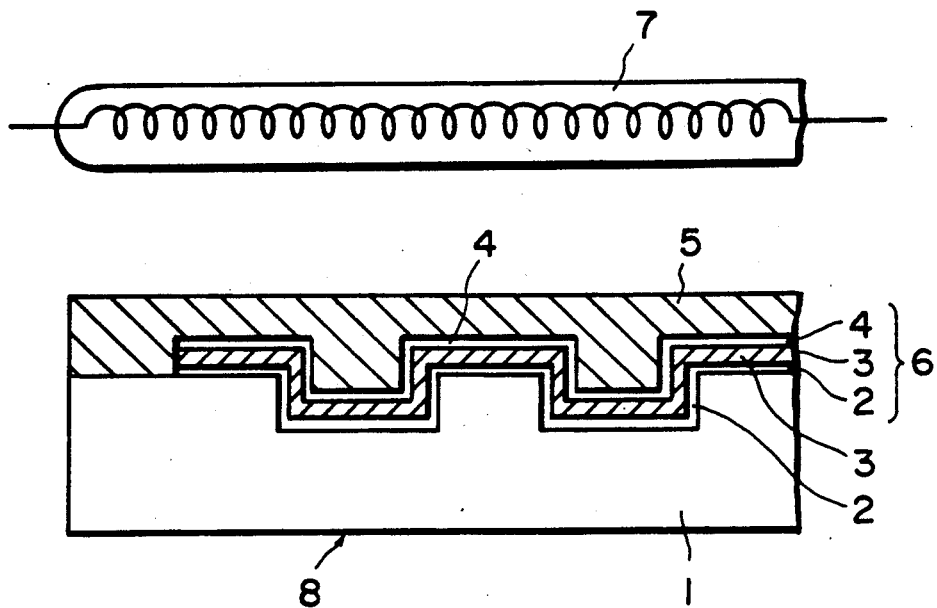
F I G. 1
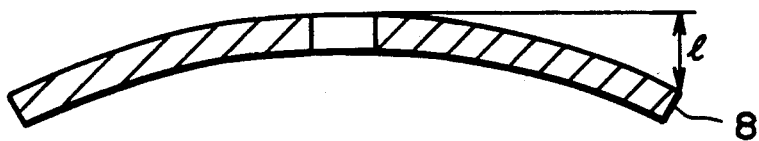
F I G. 2

OPTICAL RECORDING MEDIUM AND PROCESS FOR PRODUCTION THEREOF

FIELD OF THE INVENTION AND RELATED ART

The present invention relates to an optical recording medium capable of recording, reproduction and/or erasure of data with a light beam and a process for producing the same.

Hitherto, as an optical recording medium for recording or reproducing data with light, there has been known a recording material comprising a recording layer formed on a substrate and sandwiched between stabilizing layers comprising an inorganic dielectric for preventing deterioration of the recording layer by oxidation, which is further covered with a transparent protective layer (U.S. Pat. No. 4,370,391 corr. to Japanese Laid-Open Patent Application JP-A-56-130393). Such a protective layer has been composed of an inorganic compound such as $SiO_2$. The protective layer is required to be as thick as several microns for surface protection. However, such a thick layer of an inorganic compound such as $SiO_2$ is brittle and is liable to crack spontaneously. For this reason, a resinous protective layer has been proposed including, e.g., one of a photopolymerizable organic substance, such as an acrylate-type resinous composition (JP-A-61-123593).

However, when such a resinous protective layer is applied to an optical recording medium of a structure as described above, the recording medium is caused to have large initial warp and/or skew due to a laree stress in the stabilization layer of an inorganic dielectric, which warp and/or skew can be enhanced under an environmental durability test (e.g., by standing for 2000 hours under 80° C. and 90% R.H.), so that it becomes impossible to load an evaluating apparatus with the recording medium, thus failing in recording, reproduction or erasure, in some cases. More specifically, the optical recording medium is deformed to be convex on the side of the laminate film due to a stress in the laminate film.

In case where the recording layer and inorganic dielectric protective layer are formed while suppressing a temperature increase of the substrate to minimize the stress in the resultant laminate film, the warp and skew can be decreased but the deterioration of the laminate film, such as occurrence of cracks in or peeling of the inorganic dielectric film, is liable to occur and the oxidation or corrosion of the recording layer is developed from the resultant defects to cause difficulties, such as an increase in bit error rate (B.E.R.) and deterioration of C/N value.

Herein, the warp refers to a deformation of the optical recording medium in the radial direction, and the skew refers to a deformation of the optical recording medium in the circumferential direction.

Heretofore, for the purpose of preventing the warp of the medium, a pair of identical structures having opposite recording layers have been applied to each other to provide a double-sided disk, or a medium is applied with an adhesive onto a rigid protective substrate as disclosed in JP-A-60-10431.

In recent years, however, a thinner and lighter medium has been required, so that a single-sided no-adhesive medium having no rigid substrate applied thereto but having only a resinous protective layer on the recording layer has been proposed, but it has been very difficult to obtain such a single-sided no-adhesive medium free of warp.

Thus, there has been known a single-sided no-adhesive optical recording medium comprising an inorganic dielectric layer, a recording layer and a resinous protective layer disposed on a substrate and free from further application of a rigid substrate, but no single-sided no-adhesive medium has been free from warp before the present invention.

SUMMARY OF THE INVENTION

In view of the above problems, an object of the present invention is to provide an optical recording medium having a minimized warp or skew which does not increase even after an environmental durability test.

Another object of the present invention is to provide an optical recording medium having a minimized bit error rate (B.E.R.) and a C/N value which does not deteriorate and ensures a reliability for a long term.

According to an aspect of the present invention, there is provided an optical recording medium comprising: a resinous substrate, a laminate film including an inorganic dielectric layer and a recording layer, and a resinous protective film, disposed on the substrate; wherein the resinous protective layer has a tensile stress of 2.5–5.5 $kg/mm^2$, and the laminate film has a compression stress of 15–55 $kg/mm^2$.

According to another aspect of the present invention, there is provided an optical recording medium, comprising: a resinous substrate, a laminate film including an inorganic dielectric layer and a recording layer, and a resinous protective film, disposed on the substrate; wherein the resinous protective layer comprises a cured film of a photocurable resin comprising 60 wt. % or more of a polyfunctional acrylate compound having 5 or more functional groups and 10 wt. % or less of a urethane acrylate compound.

According to a further aspect of the present invention, there is provided a process for producing an optical recording medium, comprising:

coating resinous substrate with a laminate film including an inorganic dielectric layer and a recording layer so as to provide the laminate film with a compression stress of 15–55 $kg/mm^2$, and coating the laminate film with a resinous protective layer so as to provide the resinous protective layer with a tensile stress of 2.5–5.5 $kg/mm^2$.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of an embodiment of the optical recording medium according to the present invention.

FIG. 2 is a schematic sectional view illustrating a warp of an optical recording medium.

DETAILED DESCRIPTION OF THE INVENTION

Figure 3:
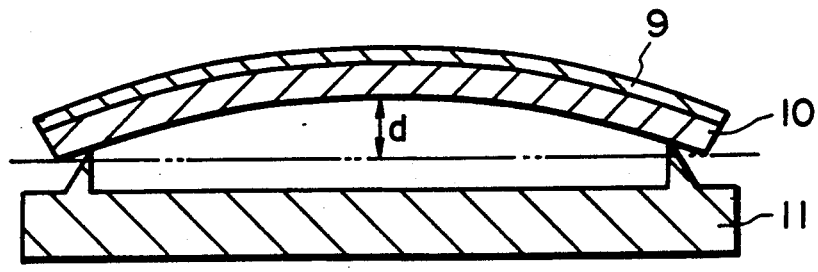
FIG. 3 is a schematic sectional view for illustrating a method of measuring a stress in a resinous protective film.

FIG. 1 shows an embodiment of the optical recording medium according to the present invention. Referring to FIG. 1, an optical recording medium 8 has a laminated structure comprising a resinous substrate 1, inorganic dielectric layers 2 and 4, a recording layer 3, and a resinous protective layer 5, wherein the recording layer 3 and inorganic dielectric layers 2 and 4 in combination constitute a laminate film 6.

The (compression) stress in the laminate film 6 according to the present invention may preferably be in the range of 15-55 kg/mm$^2$, particularly 20-50 kg/mm$^2$ in view of the stability of the recording layer. If the laminate film 6 has a stress below 15 kg/mm$^2$, the laminate film, particularly the inorganic dielectric layer therein is liable to cause cracking or peeling, and if the stress exceeds 55 kg/mm$^2$, the optical recording medium causes a large degree of warp and skew to result in cracking or peeling of the laminate film. Further, in case of an optomagnetic recording medium, a laminate film thickness in the above range provides a large magneto-optical Kerr rotation angle to result in a good S/N of detection signal.

The resinous protective film 5 according to the present invention may have a tensile stress of 2.5-5.5 kg/mm$^2$, preferably 3-5 kg/mm$^2$ for prevention of warp. A stress in the resinous protective film 5 in the above range provides a good balance with the stress in the laminate film 6 to provide an optical recording medium with little deformation.

In the present invention, the recording layer 3 may preferably comprise an inorganic material, examples of which may include amorphous magnetic recording materials, such as TbCO, GdTeCO, GdFeCO and GdTbFeCo; Bi, Al; calcogenides comprising Se, Te, etc.; and alloys of these. The recording layer can have a laminate structure of these materials. The recording layer may preferably have a thickness of 200-1000 Å, particularly 500-900 Å. Further, in the present invention, the recording layer can constitute a reflection layer for a readout beam for reproducing data recorded in advance, which is not used for writing data therein.

The inorganic dielectric layers 2 and 4 may preferably comprise $Si_3N_4$, $SiO_x$, ZnS, SiC, etc., among which $Si_3N_4$ is particularly preferred. The inorganic dielectric layer is formed on at least one side of the recording layer 3 but is preferably formed on both sides of the recording layer in order to sufficiently protect the recording layer.

The inorganic dielectric layer may preferably have a thickness of 100-1000 Å, further preferably 400-1000 Å, particularly 450-750 Å.

The layers in the laminate film 6 may preferably be formed by vapor deposition, such as vacuum evaporation or sputtering, so as to provide a uniform film, and sputtering is particularly preferred since the stress in these layers can be easily controlled. The stress in the laminate film 6 can be adjusted by controlling the film-forming conditions of the respective layers including the inorganic dielectric layer(s) and recording layer, inclusive of sputtering pressure, input power and disposition of target in case of sputtering, and further control of $N_2$ partial pressure. More specifically, in case of forming a laminate film composed of inorganic dielectric layer/recording layer/inorganic dielectric layer comprising 650 Å-thick $Si_3N_4$ layer/400 Å-thick Gd-Tb amorphous recording layer and 400 Å-thick Tb-Fe amorphous recording layer/700 Å-thick $Si_3N_4$ layer by sputtering, the first $Si_3N_4$ layer may be formed under a sputtering pressure of 0.1-0.3 Pa and an input power of 500-1500 W, the recording layer may be formed under 0.2-0.5 Pa and 500-1500 W, and the second $Si_3N_4$ layer may be formed under 0.1-0.3 Pa and 500-1500 W to provide a laminate film with a compression stress of 15-55 kg/mm$^2$.

In the present invention, it is also possible to form a reflecting film of, e.g., Al, on the laminate film including the inorganic dielectric layer and recording layer so as to improve the C/N value.

The resinous protective film may suitably be formed from a resin providing its cured film with a tensile stress of 2.5-5.5 kg/mm$^2$, which may be thermosetting resin, photo-curable resin and electron beam-curable resin. From the viewpoint of providing a protective film capable of preventing transmission of oxygen and moisture and having an appropriate tensile stress, photo- or ultraviolet-curable or electron beam-curable resin may suitably be used. The ultraviolet-curable resin may suitably be an acrylate-type resin composition or a photopolymerizable epoxy resin, particularly an acrylate-type resin composition for easy adjustment of the stress. The ultraviolet-curable acrylate-type resin may suitably comprise (A) a prepolymer component, (B) a reactive diluent component, and (C) a photopolymerization initiator, wherein the components (A) and (B) are mixed in proportions of 0-100 wt. %, preferably, 5-95 wt. % and 100-0 wt. %, preferably, 95-5 wt. %, respectively, and the component (C) is preferably contained in a proportion of 0.1-10 wt. %. Examples of the component (A) may include polyester acrylate, urethane acrylate, and epoxy acrylate. The component (B) may suitably be a mono-functional monomer or a polyfunctional monomer, such as an acrylic acid ester of a polyhydric alcohol. The component (C) may be ay known photopolymerization initiator but may preferably be one providing a composition with a good storage stability, examples of which may include initiators of benzoin alkyl ether-type, acetophenone-type, propiophenone-type, anthraquinone-type, and thioxanthone-type. These initiators may be used singly or in a mixture of two or more species in any proportions.

In the present invention, an ultraviolet-curable acrylate-type resin composition providing a cured film with a tensile stress of 2.5-5.5 kg/mm$^2$ may be selected from those described above.

A preferred class of the acrylate-type resin composition may be formed as a mixture comprising 60 wt. % or more of a polyfunctional acrylate compound having 5 or more functional groups (i.e., acrylate groups) as a component (B) and 10 wt. % or less of a urethane acrylate compound as a component (A). The resin composition provides a dense protective layer having a high degree of crosslinking and thus having a high tensile stress and small moisture absorptivity and permeability through polymerization under irradiation with light or electron beam because it contains 60 wt. % or more of the polyfunctional acrylate compound, and also provides the protective film with a sufficient flexibility free from cracking, etc., while retaining a high stress, because it contains 10 wt. % or less of the urethane acrylate compound so as to compensate for a decrease in flexibility of the protective film caused by the increased content of the polyfunctional acrylate compound. Further, the resultant resinous protective film has a high gel content and contains little non-reacted monomer, so that corrosion or pitting of the recording layer due to such non-reacted monomer can be suppressed to provide an optical recording medium having minimized skew or warp, a decreased B.E.R., little degradability in C/N value and thus having a particularly excellent long-term reliability.

The urethane acrylate compound is free from remaining of acrylic acid at the time of curing and has a small moisture-absorptivity and a large heat resistance compared with other flexibility imparting compounds, such as epoxy acrylate, polyester acrylate and polyether acrylates, so that it is particularly suitably used in the resinous protective layer according to the present invention.

In the resinous protective layer, the polyfunctional acrylate compound having 5 or more functional groups may preferably constitute 60 wt. % or more, particularly 75 wt. % or more, further preferably 85 wt. % or more, of the components constituting the resinous protective layer. Further, the urethane acrylate compound may preferably constitute 10 wt. % or less, particularly 2-8 wt. %, of the components constituting the protective layer.

Examples of the polyfunctional acrylate compound having 5 or more functional groups may include: dipentaerythritol hexaacrylate, dipentaerythritol pentaacrylate, dipentaerythritol hexamethacrylate, dipentaerythritol hexa($\omega$-acryloyloxy-$\epsilon$-caproate), and dipentaerythritol hexa($\omega$-methacryloyloxy-$\epsilon$-caproate). These compounds may be used singly or in mixture. Among these, dipentaerythritol hexaacrylate is particularly preferred in respect of providing a high stress and a high degree of crosslinking.

The urethane acrylate compound may be prepared by urethanation between an addition condensation product of a carbonate diol (average molecular weight=5-00-5000) and $\epsilon$-caprolactone (I) and an organic polyisocyanate (II), followed by acrylate formation by reaction with a hydroxyacrylate compound (III).

The carbonate diol giving the urethane acrylate compound according to the present invention may for example be prepared through transesterification between (a) a carbonate derivative which may be selected from a class including diaryl carbonates or dialkyl carbonates, such as diphenyl carbonate, bischlorophenyl carbonate, dinaphthyl carbonate, phenyl tolyl carbonate, phenyl chlorophenyl carbonate, 2-tolyl 4-tolyl carbonate, dimethyl carbonate and diethyl carbonate, and (b) a diol or a polyester diol which may be selected from diols, such as 1,6-hexanediol, neopentyl glycol, 1,4-butanediol, 1,8-octanediol, 1,4-bis(hydroxymethyl)cyclohexane, 2-methylpropanediol, dipropylene glycol and dibutylene glycol, or polyester diols obtained by reacting the diols with dicarboxylic acids, such as oxalic acid, malonic acid, succinic acid, adipic acid, azelaic acid, and hexahydrophthalic acid.

The thus obtained carbonate diol may be a monocarbonate diol having one carbonate structure in its molecule or a polycarbonate diol having two or more carbonate structures in its molecule. Commercially available examples of the carbonate diol may include: Desmophen 2020E (mfd. by Sumitomo Bayer K.K.), DN-980 (Nihon Polyurethane K.K.), DN-981 (Nihon Polyurethane K.K.), and DN-983 (Nihon Polyurethane K.K.).

The reaction between the carbonate diol and the $\epsilon$-caprolactone may preferably be effected in the presence of a catalyst in a catalytically effective amount, which may preferably be 0.001-1.0 wt. %, particularly 0.01-0.2 wt. %, of the $\epsilon$-caprolactone. Examples of the catalyst effective for the reaction may include: organic titanium compounds, such as tetraisopropyl titanate and tetrabutyl titanate, and tin compounds, such as tetraphenyltin and tetraoctyltin. The reaction between the carbonate diol and the $\epsilon$-caprolactone may be initiated at a temperature of 110°-200° C. and continued for a time sufficient for the completion of the reaction. The $\epsilon$-caprolactone may preferably be used in an amount of 1-5 mols per mol of the carbonate diol.

In order to minimize oxidation as a side reaction, the reaction may preferably be effected in an inert gas atmosphere of nitrogen, etc. The reaction mixture including the addition condensation product thus obtained can be used as it is in a subsequent reaction.

The urethane acrylate compound in the present invention may preferably contain averagely 1-5 mols of $\epsilon$-caprolactone added thereto.

Next, examples of the organic polyisocyanate (II) may include isophorone diisocyanate, hexamethylene diisocyanate, tolylene diisocyanate, xylylene diisocyanate, diphenylmethane-4,4'-diisocyanate, lysine diisocyanate, and dimer acid diisocyanate. The urethane formation reaction between the addition condensation product (I) and the organic polyisocyanate (II) may preferably be effected at 50°-80° C.

Examples of the hydroxyacrylate compound (III) may include hydroxyethyl acrylate and hydroxypropyl acrylate. In the acrylate formation reaction, a hydroxyacrylate compound may be used in a stichiometric amount or a small excess thereof for acrylating the terminal isocyanate group resultant in the above urethanation. The reaction may be effected in the presence of a known catalyst, such as a tertiary amine, dibutyltin dilaurate or dioctyltin dilaurate in order to promote the reaction between the isocyanate group and the hydroxyl group. In order to prevent gel formation due to radical polymerization during the reaction, it is preferred to add a polymerization inhibitor, such as hydroquione, hydroquinone monomethyl ether, methylhydroquinone, p-benzoquinone or phenothiazine in a proportion of 50-2000 ppm in advance of the reaction. The reaction temperature may preferably be 60°-90° C.

The resin composition for providing the resinous protective layer according to the present invention may preferably contain a photopolymerization initiator in addition to the above components (A) and (B).

The photopolymerization initiator may be selected from a wide scope of compounds which can absorb ultraviolet rays to generate radicals. Representative examples thereof may include acetophenones, such as p-tert-butyltrichloroacetophenone, 2,2'-diethoxyacetophenone and 2-hydroxy-2-methyl-1- phenylpropane-1-one; ketones, such as benzophenone, Michler's ketone, 2-chlorothioxanthone, and 2isopropylthioxanthone; benzoin and benzoin ethers, such as benzoin isopropyl ether; and benzil and benzil ketals, such as benzil dimethyl ketal, and hydroxycyclohexyl phenyl ketone.

These photopolymerization initiators may be used singly or in mixture of two or more species. The photopolymerization initiator may preferably be added in a proportion of 0.1-10 wt. %, particularly 1-5 wt. %.

The composition for the resinous protective layer can further contain other additives, such as silane coupling agent, polymerization inhibitor, and leveling agent.

These additives may be added in a proportion of 0-5 wt. %, respectively, of the composition.

In addition to the above polyfunctional compound and the urethane acrylate compound as preferred components, the photo-curable composition can further contain other compounds selected from the above components (A) and (B), a preferred example of which may be a polymerizable monomer having four or less functional groups, such as TMPTA (trimethylolpropane triacrylate and MANDA (neopentyl hydroxypivalate diacrylate). The addition amount thereof should preferably be suppressed in the range of 0-30 wt. %, particularly 0-15 wt. %, so as to prevent corrosion and warp of the laminate film.

The resinous protective layer in the optical recording medium according to the present invention may preferably have a thickness of 2-20 microns, particularly 5-15 microns. Above 20 microns, the resinous protective layer is liable to peel due to curing shrinkage. On the other hand, below 2 microns, the laminate film 6 cannot be sufficiently protected from external damage.

The resinous protective layer according to the present invention may be formed by application of the composition by means of a spin coater, a roller coater, a bar coater, etc., followed by irradiation with ultraviolet rays or electron beam for curing.

The resinous substrate 1 may be composed of acrylic resin, polycarbonate resin, polystyrene resin, polyolefin resin. The substrate may preferably have a thickness free from difficulty in recording and/or reproduction due to dust attached to the surface thereof, for example, 0.3-5 mm, particularly about 0.8-1.5 mm.

A pair of the optical recording media according to the invention can be applied to each other with an adhesive disposed between the resinous protective layers so as to dispose the resin substrates on the outer sides, thus forming a double-sided medium. However, the medium according to the present invention is particularly effectively used as a single-sided optical recording medium which is liable to warp.

It is possible to include particles of alumina, zirconia, SiN, $SiO_2$, $TiO_2$, etc., as a filler in the resinous protective layer. The surface smoothness of the resinous protective layer can be improved by inclusion of such particles, so that it becomes possible to prevent crush of a magnetic head in an optical recording medium of the magnetic field-modulated overwrite-type having an amorphous magnetic recording layer and using a floating type magnetic head.

As described above, according to the present invention, there is provided an optical recording medium which is free from cracking or peeling of the laminate film, has a minimized warp or skew and accordingly has suppressed the occurrence of errors in the recording, reproduction and erasure.

Further, the present invention provides an optical recording medium which is free from corrosion or pitting of the laminate film due to residual monomer, etc., in the resinous protective layer, is free from deterioration, has minimized warp or skew and thus can retain a long term reliability.

Hereinbelow, the present invention will be explained in more detail with reference to the Examples.

EXAMPLE 1

A 1.2 mm-thick polycarbonate substrate having a guide groove and a preformat pit was coated with a 500 Å-thick $Si_3N_4$ layer 2 by sputtering (pressure: 0.2 Pa, input power: 500 W), a laminate magnetic recording layer 3 including a 400 Å-thick amorphous GdTb layer and a 400 Å-thick TbFe layer respectively formed by sputtering (pressure: 0.3 Pa, input power: 500 W) and then with a 700 Å-thick $Si_3N_4$ layer formed by sputtering (pressure: 0.2 Pa, input power: 500 W) to form a laminate film 6 having a compression stress of about 30 kg/mm². Separately, an acrylate-type ultraviolet-curable resin having the following composition was provided.

| (Composition) | |
|---|---|
| Caprolactone-modified dipentaerythritol hexaacrylate (trade name: KAYARAD DPCA-30, mfd. by Nihon Kayaku K.K.) | 50 wt. % |
| Dioxane glycol diacrylate (trade name: KAYARAD R-604, mfd. by Nihon Kayaku K.K.) | 45 wt. % |
| Photopolymerization initiator (trade name: IRG-184, mfd. by Ciba-Geigy A.G.) | 5 wt. % |

The ultraviolet-curable resin was applied on the laminate film by spin coating at 4000 rpm for 7 sec., followed by curing with irradiation from a UV lamp 7 issuing rays at a wavelength of 365 nm and an intensity on the surface of 233 mW/cm² for 7 sec., to form a 7 micron-thick resinous protective film having a tensile stress of 2-6 kg/mm², thereby obtaining an optical recording medium.

EXAMPLE 2

An optical recording medium was prepared in the same manner as in Example 1 except that the UV-curable resin was replaced by one having the following composition to form a protective resin layer having a tensile stress of 3.5 kg/mm².

| (Composition) | |
|---|---|
| Caprolactone-modified dipentaerythritol hexaacrylate (KAYARAD DPCA-30, mfd. by Nihon Kayaku K.K.) | 60 wt. % |
| Dioxane glycol diacrylate (KAYARAD R-604, mfd. by Nihon Kayaku K.K.) | 35 wt. % |
| Photopolymerization initiator (IRG-184, mfd. by Ciba-Geigy A.G.) | 5 wt. % |

EXAMPLE 3

An optical recording medium was prepared in the same manner as in Example 1 except that the UV-curable resin was replaced by one having the following composition to form a protective resin layer having a tensile stress of 5.0 kg/mm².

| (Composition) | |
|---|---|
| Caprolactone-modified dipentaerythritol hexaacrylate (KAYARAD DPCA-30, mfd. by Nihon Kayaku K.K.) | 70 wt. % |
| Dioxane glycol diacrylate (KAYARAD R-604, mfd. by Nihon Kayaku K.K.) | 25 wt. % |
| Photopolymerization initiator (IRG-184, mfd. by Ciba-Geigy A.G.) | 5 wt. % |

EXAMPLE 4

An optical modulation-type overwritable optical recording medium was prepared in the same manner as in Example 1 except that the laminate film was formed by sputtering on the polycarbonate substrate 1 so as to comprise a 600 Å-thick SiN layer 2 (sputtering pressure: 0.3 Pa, input power: 500 W), a laminate magnetic layer 3 including a 400 Å-thick TbFeCo magnetic layer and an 800 Å-thick GdDyFeCo magnetic layer (sputtering pressure: 0.3 Pa, input power: 500 W) and a 900 Å-thick SiN layer (sputtering pressure: 0.3 Pa, input power: 500 W) to have a compression stress of 30 kg/mm$^2$.

COMPARATIVE EXAMPLE 1

An optical recording medium was prepared in the same manner as in Example 1 except that the UV-curable resin was replaced by one having the following composition to form a protective resin film having a tensile stress of 1.2 kg/mm$^2$.

| (Composition) | |
|---|---|
| Neopentyl glycol diacrylate (di-functional) (KAYARAD-NPGDA, Nihon Kayaku K.K.) | 40 wt. % |
| TMPA (tri-functional) (KAYARAD-TMPTA, Nihon Kayaku K.K.) | 40 wt. % |
| Dicyclopentenyl acrylate (FA-57A, Hitachi Kasei K.K.) | 10 wt. % |
| Photopolymerization initiator (KAYACURE BP, Nihon Kayaku K.K.) | 10 wt. % |

COMPARATIVE EXAMPLES 2 AND 3

Optical recording media were prepared in the same manner as in Example 1 except for using the following compositions for preparing the resinous protective layers.

| (Composition for Comparative Example 2) | |
|---|---|
| Dipentaerythritol hexaacrylate (hexa-functional) (DPCA-60, mfd. by Nihon Kayaku K.K.) | 50 wt. % |
| Dicyclopentenyl acrylate (mono-functional) | 40 wt. % |
| Urethane acrylate (Allonix M-1100, mfd. by Toa Gosei Kagaku K.K.) | 5 wt. % |
| Photopolymerization initiator (IRG-184, Nihon Ciba-Geigy K.K. | 5 wt. % |

| (Composition for Comparative Example 3) | |
|---|---|
| Dipentaerythritol hexaacrylate (hexa-functional) (DPCA-60, Nihon Kayaku K.K.) | 40 wt. % |
| Urethane acrylate (Arronix M-1100, Toa Gosei Kagaku K.K.) | 20 wt. % |
| TMPTA (KAYARAD-TMPTA, Nihon Kayaku K.K.) | 35 wt. % |
| Photopolymerization initiator (IRG-184, Nihon Ciba-Geigy K.K.) | 5 wt. % |

COMPARATIVE EXAMPLE 4

A 1.2 mm-thick polycarbonate substrate 1 having a guide groove and a preformat pit was coated with a 500 Å-thick inorganic dielectric layer of Si$_3$N$_4$ formed by sputtering (pressure: 0.4 Pa, input power: 500 W), a laminate opto-magnetic recording layer 3 including a 400 Å-thick amorphous GdTb layer and a 400 Å-thick amorphous TbFe layer respectively by sputtering (pressure: 0.6 Pa, input power: 550 W), and then with a 700 Å-thick inorganic dielectric layer of SiN formed by sputtering (pressure: 0.4 Pa, input power: 500 W) to form a laminate film having a compression strength of 11 kg/mm$^2$, followed by coating with a 7 micron-thick protective layer of a photo-cationically polymerizable epoxy resin (trade name: KR-400, mfd. by Asahi Denka K K.) to form an optical recording medium.

The optical recording medium was accompanied with little warp or skew and no increase in warp or skew was observed after a durability test, but the laminate film caused a crack to result in corrosion in the recording layer.

Tables 1 and 2 appearing at the end hereof summarize measured data of warp, skew, C/N value and B.E.R. for the optical recording media prepared in the above Examples and Comparative Examples as prepared and after a durability test for 2000 hours under the conditions of 80° C. and 90% RH, and the stress values in the resinous protective layers and laminate films in the media.

The measurement of C/N value and B.E.R. were performed by using an optomagnetic recording and reproduction tester (trade name: OS-2000, mfd. by Nakamichi K.K.) for recording and reproducing 5 MHz signals at a revolution speed of 1800 rpm and reproduction at a laser power of 5 mW.

EXAMPLE 5

An optical recording medium was prepared in the same manner as in Example 1 except that the UV-curable resin was replaced by one having the following composition to form a protective resin layer having a tensile stress of 4.9 kg/mm$^2$.

| (Composition) | |
|---|---|
| Caprolactone-modified dipentaerythritol hexaacrylate (hexa-functional) (KAYARAD DPCA-30, mfd. by Nihon Kayaku K.K.) | 85 wt. % |
| Urethane acrylate (Arronix M-1100, Toa Gosei Kagaku K.K.) | 10 wt. % |
| Photopolymerization initiator (IRG-184, mfd. by Ciba-Geigy A.G.) | 5 wt. % |

EXAMPLES 6–9

Optical recording media were prepared in the same manner as in Example 1 except for using the following composition for preparing the resinous protective layers.

| (Composition for Example 6) | |
|---|---|
| Dipentaerythritol monohydroxypentaacrylate (penta-functional) (SR-399, mfd. by Sartomer Co.) | 90 wt. % |
| Urethane acrylate (Allonix M-1100, mfd. by Toa Gosei Kagaku K.K.) | 5 wt. % |
| Photopolymerization initiator (IRG-184, Nihon Ciba-Geigy K.K.) | 5 wt. % |

| (Composition for Example 7) | |
|---|---|
| Alkyl-modified dipentaerythritol pentaacrylate (penta-functional) (KAYARAD D-310, Nihon Kayaku K.K.) | 94 wt. % |
| Urethane acrylate (ARTRESIN UN-9000, Negami Kogyo K.K.) | 4 wt. % |
| Photopolymerization initiator (IRG-184, Nihon Ciba-Geigy K.K.) | 2 wt. % |

| (Composition for Example 8) | |
|---|---|
| Alkyl-modified dipentaerythritol pentaacrylate (penta-functional) (KAYARAD D-310, Nihon Kayaku K.K.) | 62 wt. % |
| Urethane acrylate (ARTRESIN UN-9000, Negami | 4 wt. % |

-continued

(Composition for Example 8)

| | |
|---|---|
| Kogyo K.K.) | |
| Photopolymerization initiator (IRG-184, Nihon Ciba-Geigy K.K.) | 5 wt. % |
| TMPTA (KAYARAD-TMPTA, Nihon Kayaku K.K.) | 15 wt. % |
| MANDA (KAYARAD-MANDA, Nihon Kayaku K.K.) | 14 wt. % |

(Composition for Example 9)

| | |
|---|---|
| Dipentaerythritol monohydroxypentaacrylate (SR-399) | 75 wt. % |
| Urethane acrylate (ARTRESIN UN-9000, Negami Kogyo K.K.) | 6 wt. % |
| Photopolymerization initiator (IRG-184, Nihon Ciba-Geigy K.K.) | 5 wt. % |
| MANDA (KAYARAD-MANDA, Nihon Kayaku K.K.) | 14 wt. % |

(Composition for Example 10)

| | |
|---|---|
| Dipentaerythritol hexaacrylate (hexa-functional) (KAYARAD DPCA-30, Nihon Kayaku K.K.) | 90 wt. % |
| TMPTA (tri-functional) (KAYARAD TMPTA, Nihon Kayaku K.K.) | 5 wt. % |
| Photopolymerization initiator (IRG-184, Nihon Ciba-Geigy K.K.) | 5 wt. % |

(Composition for Example 11)

| | |
|---|---|
| Dipentaerythritol hexaacrylate (hexa-functional) (KAYARAD DPCA-30, Nihon Kayaku K.K.) | 85 wt. % |
| Bisphenol A diglycidyl ether (Epikote 828, Yuka Shell K.K.) | 10 wt. % |
| Photopolymerization initiator (IRG-184, Nihon Ciba-Geigy K.K.) | 5 wt. % |

EXAMPLE 12

A 1.2 mm-thick polycarbonate substrate 1 having a guide groove and a preformat pit was coated with a 100 Å-thick inorganic dielectric layer of SiN formed by sputtering (pressure: 0.25 Pa, input power: 500 W), a laminate recording layer 3 including a 100 Å-thick amorphous GdFeCo layer and a 200 Å-thick amorphous TbFeCo layer respectively by sputtering (pressure: 0.4 Pa, input power: 540 W), and then with a 300 Å-thick inorganic dielectric layer 4 of SiN formed by sputtering (pressure: 0.25 Pa, input power: 500 W) to form a laminate film having a compression strength of 15 kg/mm².

Then, a UV-curable resin having a composition shown below was applied by spin coating (4000 rpm, 7 sec) on the laminate film and then cured by irradiation from a UV lamp 6 issuing UV rays of 365 nm having a intensity on the surface of 233 mW/cm² for 7 sec., to form a 7 micron-thick resinous protective layer 5, thereby obtaining an optical recording medium.

(Composition)

| | |
|---|---|
| Alkyl-modified dipentaerythritol pentaacrylate (penta-functional) (KAYARAD D-310, Nihon Kayaku K.K.) | 62 wt. % |
| Urethane acrylate (Allonix M-1100, Toa Gosei Kagaku K.K.) | 4 wt. % |
| Photopolymerization initiator (IRG-184, Nihon Ciba-Geigy K.K.) | 5 wt. % |
| TMPTA (KAYARAD-TMPTA, Nihon Kayaku K.K.) | 15 wt. % |
| MANDA (KAYARAD-MANDA, Nihon Kayaku K.K.) | 14 wt. % |

The measured data of warp, skew, C/N value and B.E.R. for the optical recording media according to the above Examples 5–12 as prepared and after a durability test for 2000 hours under the conditions of 80° C. and 90 % RH, and the stress values in the resinous protective layers and the laminate films, are also shown in Tables 1 and 2 appearing at the end.

As shown in Table 1, the optical recording media obtained in Example 1 showed improvements in respects of warp and skew even in the initial stage and showed substantially no increase in warp or skew even after the durability test.

Further, as shown in Examples 5–9 and 12, when a photocurable composition comprising 60 wt. % or more of a polyfunctional acrylate compound having 5 or more functional groups and 10 wt. % or less of a urethane acrylate was used for constituting the resinous protective layer, there was provided an optical recording medium which caused no corrosion in the laminate film, no decrease in C/N value or no increase in B.E.R.

On the other hand, as shown in Table 2, Comparative Examples 1, 2 and 3 provided optical recording media which showed warp and skew which were large even at the initial stage and further increased after the durability test, due to a small stress in the resinous protective layer. Further, these media caused corrosion or pitting in the optical recording, thus causing a deterioration in both C/N value and B.E.R. Further, the medium according to Comparative Example 4 having a small stress in the laminate film caused a decrease in warp and skew but also resulted in a crack in the laminate film.

The stress referred to herein in the resinous protective layers is based on values measured according to the following method. Referring to FIG. 3, a silicon disk substrate 10 is coated with a sample photocurable resin composition used for constituting the resinous protective layer, followed by curing, to form a prescribed thickness (5–8 microns) of a cured film 9. The coated substrate is placed on a stress gauge 11 (mfd. by Ionic Systems K.K.), the resultant warp d is measured as shown in FIG. 3, and the stress $\sigma$ in the cured resin film is calculated according to the following equation (1).

$$\sigma = (d/r^2) [ES/3(1-v)] (Ts^2/Tf) \quad (1)$$

wherein
- Es: Young's modulus of the silicon substrate,
- $v$: Poisson ratio of the silicon substrate,
- Ts: thickness of the silicon substrate,
- Tf: thickness of the cured resin film, and
- r: radius of the silicon substrate.

Further, the stress in the laminate film is based on values measured according to the following method. That is, the stress $\sigma'$ in the laminate film 6 is calculated according to the following equation (2).

$$\sigma' = Eb^2/6(1-v)rd \quad (2)$$

wherein
- E: Young's modulus of the substrate (constant),
- $v$: Poisson ratio of the substrate (constant), r: radius of curvature resultant in the substrate, having the laminate film 6 thereon, "After test" in the heading means the value after the durability test.

TABLE 1

| | Warp l (μm) | | Skew (°) | | Stress (kg/mm²) | | C/N (dB) | | | B.E.R. | | |
|---|---|---|---|---|---|---|---|---|---|---|---|---|
| | Initial | After test | Initial | After test | Resin layer | Laminate film | Initial | After test | Evaluation | Initial | After test | Evaluation |
| Ex. | | | | | | | | | | | | |
| 1 | −18 | −19 | 0.11 | 0.12 | +2.6 | −30 | 51 | 45 | B | $1.0 \times 10^{-6}$ | $0.8 \times 10^{-4}$ | B |
| 2 | −20 | −20 | 0.13 | 0.13 | +3.5 | −27 | 50 | 44 | B | $1.0 \times 10^{-6}$ | $1.0 \times 10^{-4}$ | B |
| 3 | −22 | −22 | 0.14 | 0.14 | +5.0 | −33 | 50 | 45 | B | $1.0 \times 10^{-6}$ | $1.0 \times 10^{-4}$ | B |
| 4 | −16 | −17 | 0.10 | 0.10 | +2.8 | −30 | 51 | 44 | C | $1.0 \times 10^{-6}$ | $1.1 \times 10^{-4}$ | B |
| 5 | −10 | −12 | 0.08 | 0.09 | +4.9 | −30 | 50 | 49 | A | $1.0 \times 10^{-6}$ | $0.9 \times 10^{-6}$ | A |
| 6 | −8 | −9 | 0.07 | 0.07 | +5.0 | −27 | 52 | 51 | A | $1.0 \times 10^{-6}$ | $1.0 \times 10^{-6}$ | A |
| 7 | −5 | −7 | 0.05 | 0.06 | +5.3 | −33 | 53 | 50 | A | $0.8 \times 10^{-6}$ | $0.9 \times 10^{-6}$ | A |
| 8 | −18 | −18 | 0.13 | 0.13 | +3.7 | −30 | 52 | 50 | A | $1.1 \times 10^{-6}$ | $1.0 \times 10^{-6}$ | A |
| 9 | −13 | −14 | 0.11 | 0.10 | +4.2 | −32 | 53 | 52 | A | $1.0 \times 10^{-6}$ | $0.9 \times 10^{-6}$ | A |
| 10 | −20 | −19 | 0.10 | 0.12 | +5.2 | −31 | 50 | 40 | C | $1.0 \times 10^{-6}$ | $1.1 \times 10^{-2}$ | D |
| 11 | −10 | −11 | 0.09 | 0.10 | +4.8 | −29 | 51 | 43 | C | $1.0 \times 10^{-6}$ | $0.7 \times 10^{-3}$ | C |
| 12 | −7 | −9 | 0.06 | 0.07 | +3.7 | −15 | 53 | 52 | A | $0.8 \times 10^{-6}$ | $0.9 \times 10^{-6}$ | A |

TABLE 2

| | Warp l (μm) | | Skew (°) | | Stress (kg/mm²) | | C/N (dB) | | | B.E.R. | | |
|---|---|---|---|---|---|---|---|---|---|---|---|---|
| | Initial | After test | Initial | After test | Resin layer | Laminate film | Initial | After test | Evaluation | Initial | After test | Evaluation |
| Comp. Ex. | | | | | | | | | | | | |
| 1 | −130 | −179 | 0.32 | 0.39 | +1.2 | −29 | 50 | 41 | C | $0.4 \times 10^{-6}$ | $1.0 \times 10^{-3}$ | C |
| 2 | −25 | −27 | 0.21 | 0.23 | +2.3 | −28 | 52 | 42 | C | $1.1 \times 10^{-6}$ | $1.0 \times 10^{-3}$ | C |
| 3 | −139 | −180 | 0.35 | 0.37 | +1.9 | −30 | 49 | 39 | C | $1.0 \times 10^{-6}$ | $1.0 \times 10^{-3}$ | C | d: thickness of the laminate film, and
b: thickness of the substrate (constant).

Figure 4:
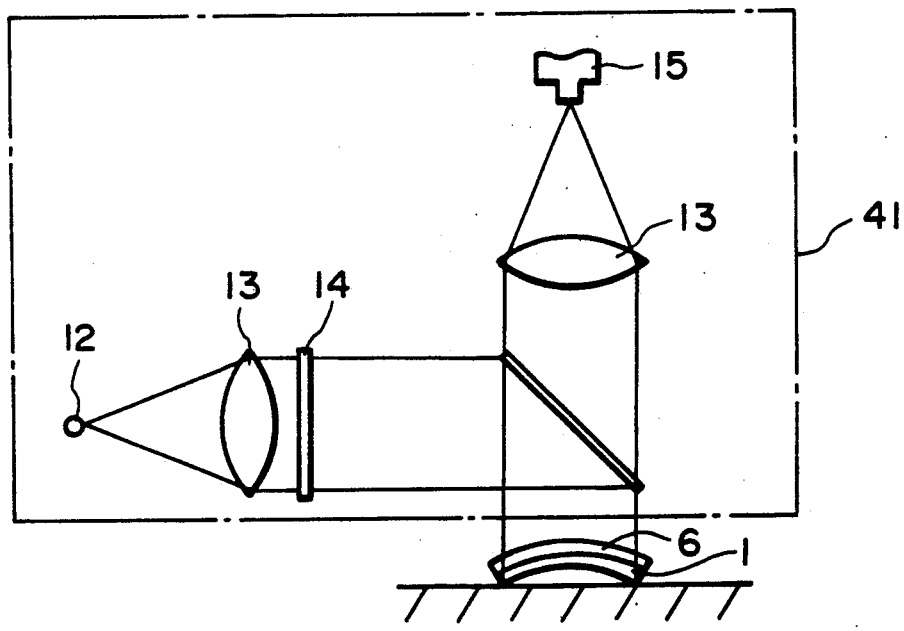
FIG. 4 is a view for illustrating a method of measuring a stress in a laminate film.

Herein, referring to FIG. 4, the radius of curvature r is calculated by measuring the number of Newton rings m resultant on the laminate film 6 formed on the substrate 1 by means of a Zygo's interferometer 41 including a light source 12, lenses 13, a filter 14 and a camera 15, and by using the following equation (3).

$$r = a^2/m\lambda \quad (3)$$

wherein
a: radius of the substrate, and
λ: wavelength of light from the source 12 in the interferometer.

The warp and skew are based on values measured by a flatness tester (trade name: KS-916, mfd. by Anritsu Denki K.K.).

The measured data for the above Examples and Comparative Examples are summarized in the following Tables 1 and 2, wherein the evaluation was performed according to the following standards:

[C/N]
The decrease in C/N value after the durability test was classified according to the following standards:
A: 3 dB or below, B: 4–5 dB, C: 7 dB or above.

[B.E.R.]
The value after the durability test was classified according to the following standards:
A: Retained at a level of $10^{-6}$
B: Lowered to a level of $10^{-4}$
C: Lowered to a level of $10^{-3}$
D: Lowered to a level of $10^{-2}$ Further, the sign "−" before the value of warp indicates that the warp occurred to form a convexity on the laminate film side.

The sign "+" before the stress value indicates a tensile stress and the sign "−" indicates a compression stress.

What is claimed is:

1. An optical recording medium comprising: a resinous substrate, a laminate film including an inorganic dielectric layer and a recording layer, and a resinous protective film, disposed on the substrate; wherein the resinous protective layer has a tensile stress of 2.5–5.5 kg/mm², and the laminate film has a compression stress of 15–55 kg/mm².

2. A medium according to claim 1, wherein the resinous protective film comprises a cured film of a photocurable resin.

3. A medium according to claim 1, wherein the recording layer comprises an inorganic compound.

4. A medium according to claim 1, wherein the inorganic dielectric layer is disposed on both sides of the recording layer to form the laminate film.

5. A medium according to claim 3, wherein the recording layer has a laminated structure including a plurality of layers comprising mutually different inorganic compounds.

6. A medium according to claim 1, wherein the inorganic dielectric layer comprises at least one species selected from the group consisting of $Si_3N_4$, $SiO_x$, ZnS and SiC.

7. A medium according to claim 1, wherein the recording layer has a thickness of 200–1000 Å.

8. A medium according to claim 1, wherein the inorganic dielectric layer has a thickness of 400–1000 Å.

9. A medium according to claim 2, wherein the photo-curable resin comprises 60 wt. % or more of a polyfunctional acrylate compound having 5 or more functional groups and 10 wt. % or less of a urethane acrylate compound.

10. A medium according to claim 9, wherein the polyfunctional acrylate compound comprises dipentaerythritol hexaacrylate.

11. A medium according to claim 9, wherein the urethane acrylate compound is contained in a proportion of 2-8 wt. % of the photo-curable resin.

12. A medium according to claim 1, wherein the recording layer comprises an amorphous magnetic recording layer.

13. A medium according to claim 1, wherein the laminate film includes a reflecting layer.

14. A medium according to claim 1, wherein the resinous protective layer has a tensile stress of 3-5 kg/mm$^2$.

15. A medium according to claim 1, wherein the laminate film has a compression stress of 20-50 kg/mm$^2$.

16. An optical recording medium, comprising: a resinous substrate, a laminate film including an inorganic dielectric layer and a recording layer, and a resinous protective film, disposed on the substrate; wherein the resinous protective layer comprises a cured film of a photocurable resin comprising 60 wt. % or more of a polyfunctional acrylate compound having 5 or more functional groups and 10 wt. % or less of a urethane acrylate compound.

17. A medium according to claim 16, wherein the polyfunctional acrylate compound comprises dipentaerythritol hexaacrylate.

18. A medium according to claim 16, wherein the urethane acrylate compound is contained in a proportion of 2-8 wt. % of the photo-curable resin.

19. A process for producing an optical recording medium, comprising:

coating resinous substrate with a laminate film including an inorganic dielectric layer and a recording layer so as to provide the laminate film with a compression stress of 15-55 kg/mm$^2$, and coating the laminate film with a resinous protective layer so as to provide the resinous protective layer with a tensile stress of 2.5-5.5 kg/mm$^2$.

20. A process according to claim 19, wherein the laminate film is formed by sputtering or evaporation.

21. A process according to claim 19, wherein the laminate film is formed to have a compression stress of 20-50 kg/mm$^2$, and the resinous protective film is formed to have a tensile stress of 3-5 kg/mm$^2$.

22. A process according to claim 19, wherein the laminate film is formed by sputtering.

* * * * *

UNITED STATES PATENT AND TRADEMARK OFFICE
CERTIFICATE OF CORRECTION

PATENT NO. : 5,102,709
DATED : April 7, 1992
INVENTOR(S) : SHINICHI TACHIBANA, ET AL.   Page 1 of 2

It is certified that error appears in the above-identified patent and that said Letters Patent is hereby corrected as shown below:

ON THE TITLE PAGE:

IN [56] REFERENCES CITED

Under U.S. PATENT DOCUMENTS:

"4,801,599  1/1989  Aoyama et al." should read
--4,801,499  1/1989  Aoyama et al.--.

Under FOREIGN PATENT DOCUMENTS:

"130393  10/1981  Japan ." should read
--56-130393  10/1981  Japan .--.

"146461  8/1984  Japan .
 10431  1/1985  Japan .
 123593  6/1986  Japan ."     should read --59-146461  8/1984  Japan .
  60-10431   1/1985  Japan .
  61-123593  6/1986  Japan .--.

"206927  8/1988  Japan ." should read
--63-206927  8/1988  Japan .--.

COLUMN 1

Line 32, "laree" should read --large--.

COLUMN 4

Line 38, "ay" should read --any--.

COLUMN 6

Line 10, "∈ca-" should read --∈-ca- --.

UNITED STATES PATENT AND TRADEMARK OFFICE
CERTIFICATE OF CORRECTION

PATENT NO. : 5,102,709
DATED : April 7, 1992
INVENTOR(S) : SHINICHI TACHIBANA, ET AL.

It is certified that error appears in the above-identified patent and that said Letters Patent is hereby corrected as shown below:

COLUMN 7

Line 11, "addition amount" should read --additional amount--.

COLUMN 11

Line 56, "a" (second occurrence) should read --an--.

COLUMN 14

Line 34, "medium" should read --medium,--.

COLUMN 16

Line 12, "15-55 kg/mm$^2$," should read --15-55 kg/mm$^2$;--.

Signed and Sealed this

Twenty-first Day of September, 1993

Attest:

BRUCE LEHMAN

*Attesting Officer*     *Commissioner of Patents and Trademarks*